United States Patent
Lin et al.

(10) Patent No.: US 6,788,017 B2
(45) Date of Patent: Sep. 7, 2004

(54) PERIOD ADJUSTMENT CIRCUIT OF DISCONNECTION AND RESTART IC

(75) Inventors: Teng-Tsai Lin, Hsinchu (TW); Ping-Yen Chen, Hsinchu (TW)

(73) Assignee: Feeling Technology Corp., Hsinchu (TW)

( * ) Notice: Subject to any disclaimer, the term of this patent is extended or adjusted under 35 U.S.C. 154(b) by 61 days.

(21) Appl. No.: 10/247,494

(22) Filed: Sep. 20, 2002

(65) Prior Publication Data

US 2004/0012358 A1 Jan. 22, 2004

(30) Foreign Application Priority Data

Jul. 19, 2002 (TW) ........................ 91211026 U

(51) Int. Cl.[7] .................. G05B 5/00; H02H 7/08; H02P 1/04; H02P 3/00; H02P 7/00

(52) U.S. Cl. .................. 318/487; 318/254; 318/445; 318/479; 318/138; 318/439; 318/484; 318/452; 361/189; 361/195; 361/197; 361/139; 361/187

(58) Field of Search .................. 318/254, 438, 318/139, 445, 479–484, 252, 487, 478, 466, 266, 439; 361/187–202

(56) References Cited

U.S. PATENT DOCUMENTS

| | | | | |
|---|---|---|---|---|
| 3,814,950 A | * | 6/1974 | Adams | 307/141 |
| 4,211,230 A | * | 7/1980 | Woltosz | 606/40 |
| 4,490,659 A | * | 12/1984 | Hansen | 318/484 |
| 4,499,408 A | * | 2/1985 | Bitting et al. | 318/254 |
| 4,816,862 A | * | 3/1989 | Taniguchi et al. | 396/278 |
| 5,510,686 A | * | 4/1996 | Collier | 318/446 |

* cited by examiner

Primary Examiner—Randy W. Gibson
Assistant Examiner—Renata McCloud
(74) Attorney, Agent, or Firm—Rosenberg, Klein & Lee

(57) ABSTRACT

A period adjustment circuit of disconnection and restart IC comprises a second capacitor, which is connected to a resistor and a transistor connected in parallel. One end of the resistor is connected between the disconnection and restart IC and the first capacitor. When lockup of a fan motor occurs, in addition that an IC current source charges the first capacitor, the second capacitor also charges the first capacitor via the resistor until the voltage of the first capacitor reaches a disconnection voltage. The IC then enters into the disconnection state, and the voltages of the two capacitors are equal so that the second capacitor no longer charges the first capacitor. Next, the IC current source simultaneously charges the first and second capacitors until the voltage of the first capacitor reaches a system reset voltage. The first capacitor is then discharged to a restart voltage by the IC.

4 Claims, 2 Drawing Sheets

PERIOD ADJUSTMENT CIRCUIT OF DISCONNECTION AND RESTART IC

FIELD OF THE INVENTION

The present invention relates to a lockup disconnection period adjustment circuit and, more particularly, to a period adjustment circuit applied to a fan disconnection and restart IC.

BACKGROUND OF THE INVENTION

Along with progress of science and technology, high power operation of delicate electronic products is increasingly desirable. However, high-power electronic products will easily generate a large mount of heat in use. In addition to cause doubt of safety in use, components of the products will also be easily damaged or even stop functioning. Therefore, most electronic products have cooling fans in design to achieve heat-radiating effect when the products are used.

In the design of a cooling fan, appropriate selection of a motor controller not only can greatly enhance the performance of the fan, but also can ensure heat-radiating effect of the product or equipment. In a conventionally used motor control IC of a DC brushless fan, in order to prevent the rotor of the motor from being locked due to an external factor so as to be unable to operate normally and thus cause the situation of over heat and burnout when the motor operates, a lockup disconnection protection circuit is generally designed in the motor controller to automatically disconnect the electricity and stop the operation of the motor. Therefore, when the rotation of the rotor of the motor is limited, the electricity is automatically disconnected to stop the operation of the motor, hence avoiding continual rise of the temperature of the motor. However, for a disconnection IC used in a conventional disconnection protection type fan, the time and ratio of the lockup disconnection and restart are fixed. Therefore, the present invention adds in a control circuit to adjust the ratio of the periods of the disconnection and restart. Through adjustment of time ratios of the lockup and restart of a fan, the temperature rise of the fan coil can be controlled and adjusted to protect the main structure of the fan motor.

SUMMARY AND OBJECTS OF THE PRESENT INVENTION

The primary object of the present invention is to provide a period adjustment circuit applied to a fan disconnection and restart IC for adjusting the time and ratio of disconnection and restart, so that the temperature rise of a fan coil can be controlled and adjusted, thereby protecting the fan coil from over heat and burnout.

Another object of the present invention is to let a disconnection and restart IC be capable of flexibly adjusting the period ratio of the disconnection time and restart time thereof so as to apply to all specifications of disconnection ICs.

According to the present invention, a period adjustment circuit of disconnection and restart IC is connected between a disconnection and restart IC and an external first capacitor. The disconnection and restart IC provide a current source to charge the first capacitor. The period adjustment circuit comprises a second capacitor, which is connected to a resistor and a transistor connected in parallel. One end of the resistor is connected between the disconnection and restart IC and the first capacitor. When the disconnection and restart function of the IC is activated, the second capacitor charges the first capacitor via the resistor until the voltage of the first capacitor reaches a disconnection voltage. The IC then enters into the disconnection state, and the voltages of the two capacitors are equal so that the second capacitor no longer charges the first capacitor. Next, the IC current source simultaneously charges the first and second capacitors until the voltage of the first capacitor reaches a system reset voltage. The first capacitor is then discharged to a restart voltage by the IC.

The various objects and advantages of the present invention will be more readily understood from the following detailed description when read in conjunction with the appended drawings, in which:

DETAILED DESCRIPTION OF PREFERRED EMBODIMENT

Figure 1:
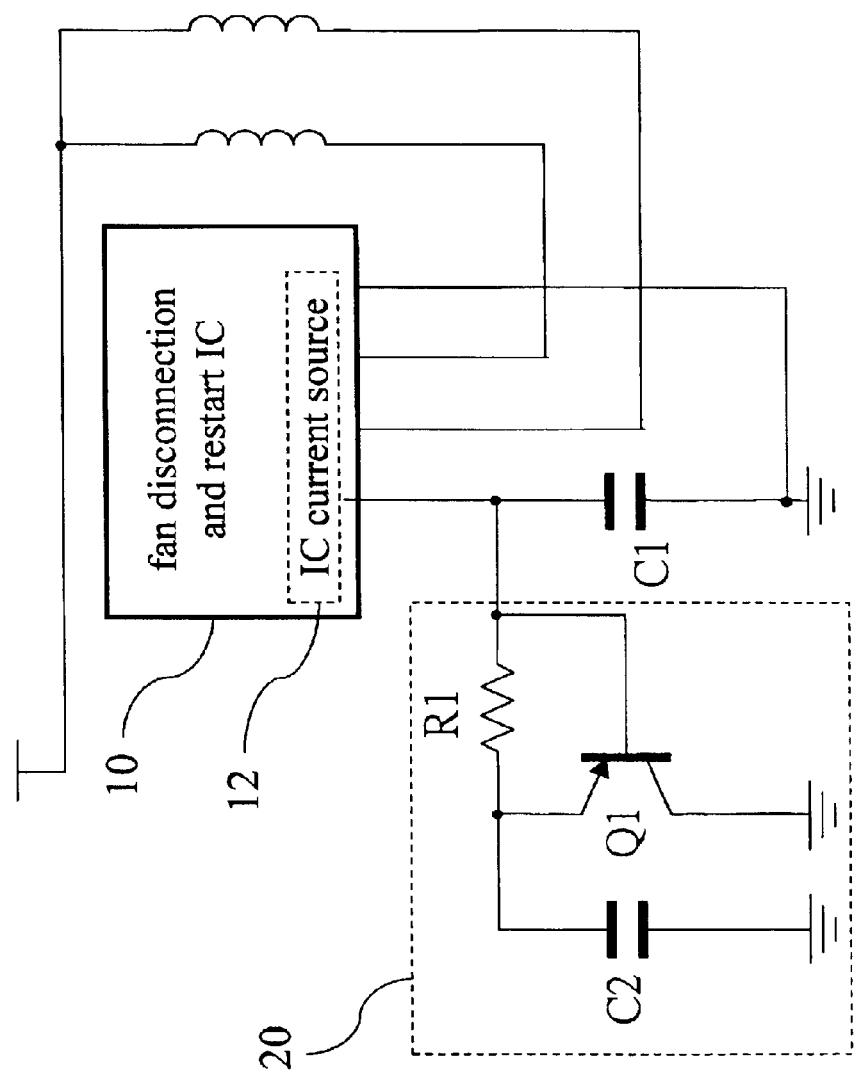
FIG. 1 is a circuit diagram of the present invention applied to a fan disconnection and restart IC.

As shown in FIG. 1, a fan disconnection and restart IC 10 having lockup detection and protection function is connected to an external first capacitor C1. The fan disconnection and restart IC 10 provides an IC current source 12 to charge the first capacitor C1. A period adjustment circuit 20 of disconnection and restart IC of the present invention is connected between the fan disconnection and restart IC 10 and the first capacitor C1.

The period adjustment circuit 20 comprises a second capacitor C2, which is connected to a resistor R1 and a PNP type transistor Q1 connected in parallel. One end of the resistor R1 is then connected between the fan disconnection and restart IC 10 and the first capacitor C1. When the IC disconnection and restart function is activated, in addition that the IC current source 12 provided by the fan disconnection and restart IC 10 charges the first capacitor C1, the second capacitor C2 also charges the first capacitor C1 via the resistor R1. The resistor R1 connected between the first capacitor C1 and the second capacitor C2 is mainly used for adjusting the charging rate of the second capacitor C2 to the first capacitor C1 to change the IC controlled reconnection time. The voltage of the second capacitor C2 can vary according to necessity by adding other components to adjust the final charged voltage of the first capacitor C1.

Figure 2:
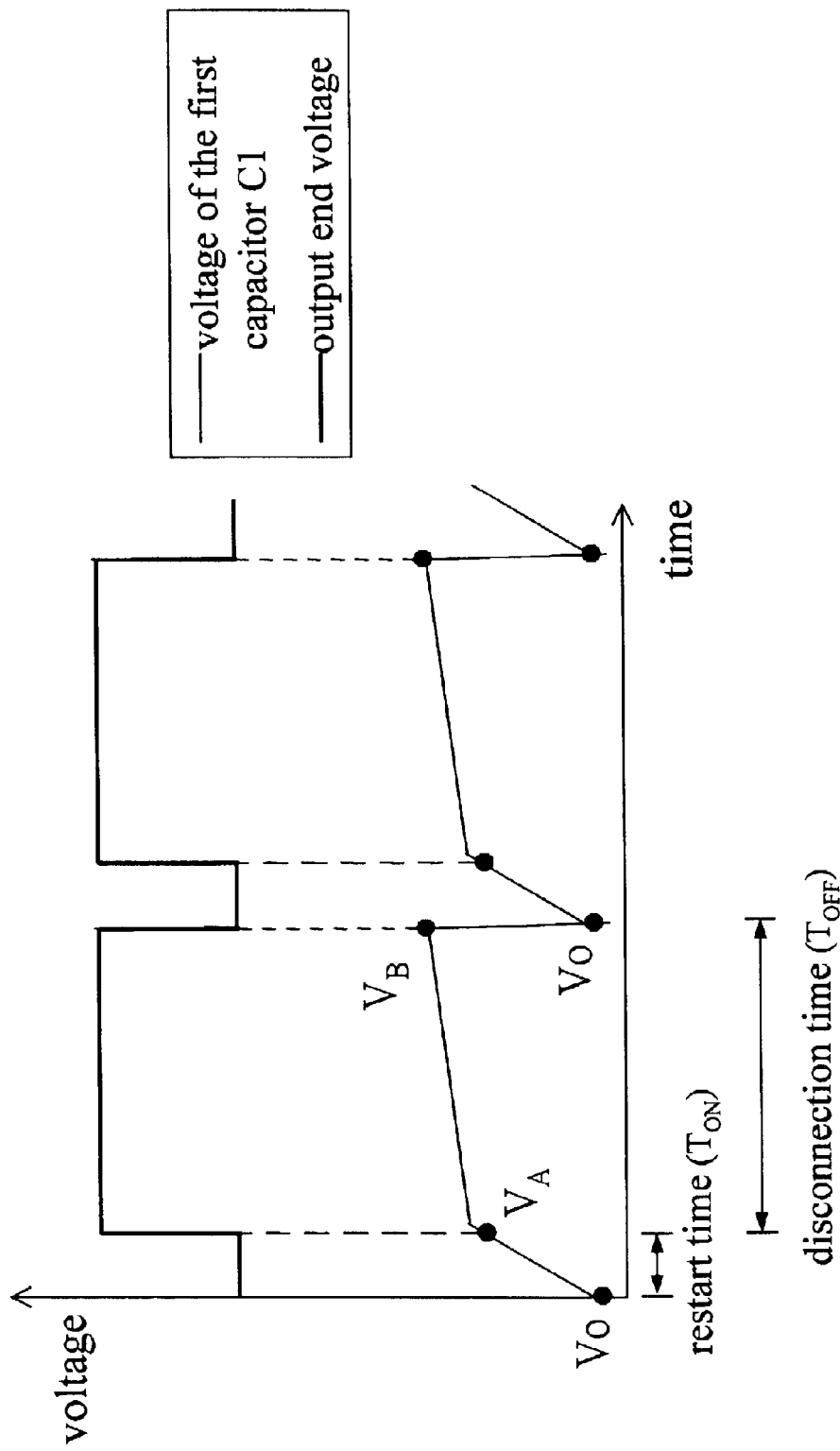
FIG. 2 shows voltage waveforms of lockup disconnection and restart of the present invention applied to a fan disconnection and restart IC.

FIG. 2 shows voltage waveforms of lockup disconnection and restart of the above period adjustment circuit 20 applied to the fan disconnection and restart IC 10. Initially, the voltage of the first capacitor C1 is $V_0$ (i.e., restart voltage), the second capacitor C2 will store a voltage of $V_0$ after the IC disconnection and restart function is activated, and the transistor Q1 has an emitter-to-base conduction voltage of $V_{BE}$. At this time, the stored voltage $V_0$ of the second capacitor C2 plus the emitter-to-base conduction voltage $V_{BE}$ of the transistor Q1 is larger than the voltage $V_0$ of the first capacitor C1. And therefore in addition that the IC current source 12 in the fan disconnection and restart IC 10 charges the first capacitor C1, the voltage of the second capacitor C2 will also provide a current to charge the first capacitor C1 via the resistor R1. The added-in circuit of the present invention lets the first capacitor C1 have two charging paths to shorten the start time of the first capacitor C1 from the initial voltage $V_0$ to a lockup disconnection voltage ($V_A$) set in the fan disconnection and restart IC 10. This period of time is the restart time ($T_{ON}$).

After the voltage of the first capacitor C1 reaches the disconnection voltage $V_A$, the fan disconnection and restart IC 10 enters into the fan disconnection state. At this time, because the voltage of the first capacitor C1 has increased, the charging current from the second capacitor C2 via the resistor R1 to the first capacitor C1 will gradually diminish, and the IC current source 12 continually charges the first capacitor C1. When the voltages of the two capacitors are equal, the second capacitor C2 will no longer provide a current to charge the first capacitor C1. Meanwhile, in addition to continually charging the first capacitor C1, the IC current source 12 also charges the path of the resistor R1 and the second capacitor C2 until the voltage of the first capacitor C1 reaches a system reset voltage $V_B$. Next, the first capacitor C1 is forced to be instantaneously discharged to the restart voltage $V_0$ by the IC, and the second capacitor C2 is also discharged to a voltage value of the restart voltage plus the emitter-to-base conduction voltage of the transistor. That is, the voltage of the second capacitor C2 becomes $V_0 + V_{BE}$ (This is the restart function of the IC). The time the first capacitor C1 and the second capacitor C2 are simultaneously charged is the disconnection time. The disconnection time of the IC is lengthened through parallel charging behaviors of the two capacitors.

The charging time during which the voltage of the first capacitor C1 goes from $V_0$ to $V_A$ is the restart time ($T_{ON}$) of the fan. During the interval of $T_{ON}$, because the IC current source 12 and the second capacitor C2 simultaneously charge the first capacitor C1, the charging rate of the first capacitor C1 can be enhanced to change the interval of $T_{ON}$. The charging time during which the voltage of the first capacitor C1 goes from $V_A$ to $V_B$ is the disconnection time ($T_{OFF}$) of the fan. Because of parallel charging behaviors of the first capacitor C1 and second capacitor C2 during the interval of $T_{OFF}$, the slope in the interval of $T_{OFF}$ will be much smaller than that of $T_{ON}$ in FIG. 2. Utilizing this principle, the period ratio of the disconnection time ($T_{OFF}$) and the restart time ($T_{ON}$) can be easily adjusted.

In the use of the fan disconnection and restart IC 10, it is usually expected that the ratio of the restart time $T_{ON}$ to the disconnection time $T_{OFF}$ is not too large. The temperature of the coil will scarcely be too high. The disconnection time $T_{OFF}$ is usually ten to several tens times as large as the restart time $T_{ON}$.

In order to more clearly illustrate the control function of the present invention applied to adjusting the ratio of the lockup disconnection and restart periods, a simpler approximate calculation method for simplifying complicated calculation steps is adopted below.

First, the restart time $T_{ON}$ can be written as:

Assume $V_0=0.3$ V $$(V_A - 0.3) \cdot C1 = (I_S + I_{R1}(t)) \cdot T_{ON} \quad (1)$$

wherein $I_S$ is the current of the IC current source providing for the first capacitor C1, and $I_{R1}(t)$ is the current of the second capacitor C2 providing for the first capacitor C1 via the resistor R1. Because $I_S$ is a fixed value, and $I_{R1}$ will diminish along with rise of the voltage of the first capacitor C1 ($I_{R1}$ is determined by the resistor R1 and the voltage difference of the first capacitor C1 and the second capacitor C2), the restart time $T_{ON}$ can be adjusted by C1 and R1.

As for the calculation of the disconnection time $T_{OFF}$, because the transistor Q1 is cutoff, the two capacitors C1 and C2 can be viewed as being connected in parallel, and the voltage changes from $V_A$ to $V_B$ during this interval of time. The disconnection time $T_{OFF}$ can thus be approximated as follows:

$$(V_B - V_A) \cdot (C1 + C2) = I_S \cdot T_{OFF} \quad (2)$$

That is, the disconnection time $T_{OFF}$ is completely determined by C1+C2 and $I_S$.

For example, if a disconnection time of 5 s and a restart time of 0.1 s is desired in design, the period ratio of $T_{ON}$ to $T_{OFF}$ is 1:50. Next, the values of $V_A$, $V_B$, and $I_S$ can be known from the specification of the fan disconnection and restart IC 10. Assume $T_{ON}$ is known to be 100 ms. Assume the initial current of $I_{R1}$ is $I_0$, the value of C1 can be calculated out from Equation (1). The value of C2 can be obtained by substituting $I_S$, $C_1$, and $V_B$ into Equation (2). Therefore, the period ratio of 1:50 can be accomplished by adjusting the values of the resistor R1, the first capacitor C1, and the second capacitor C2.

Because the present invention utilizes the second capacitor C2 and the resistor R1 to change the charging rates of the first capacitor C1 during the disconnection time and the restart time, the ratio of the disconnection and restart periods of a fan disconnection and restart IC can be flexibly adjusted. Therefore, adjustment of the ratio of the disconnection and restart periods can be accomplished according to different disconnection specifications. Moreover, the lockup disconnection ratio of a fan can be adjusted to control the temperature rise of a fan coil, hence exactly achieving the effect of protecting the fan coil.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A period adjustment circuit for use with a disconnection and restart IC connected to a DC brushless motor, the disconnection and restart IC having a current source output coupled to a first capacitor, said period adjustment circuit being connected to said current source output of said disconnection and restart IC, said period adjustment circuit comprising a second capacitor connected in series with a resistor and in parallel with a pair of terminals of a transistor, a third terminal of said transistor being connected to a current source output of said disconnection and restart IC and said first capacitor;

said first capacitor being charged from an output of said current source output of said disconnection and restart IC, said second capacitor also charges said first capacitor through said resistor until a voltage of said first capacitor reaches an activation voltage of a disconnection and restart protection function of said disconnection and restart IC, said DC brushless motor being placed in a disconnection state by said disconnection and restart IC responsive to said voltage reaching said activation voltage, said second capacitor continually charges said first capacitor through said resistor until voltages of said two capacitors are equal, said first capacitor and said second capacitor being simultaneously charged by said output of said current source output of said disconnection and restart IC until the voltage of said first capacitor reaches a system reset voltage, said disconnection and restart IC discharging said first capacitor to a restart voltage and said second capacitor to the restart voltage plus an emitter-to-base conduction voltage of said transistor responsive to said first capacitor reaching the system reset voltage.

2. The period adjustment circuit as claimed in claim 1, wherein said transistor is a PNP type transistor.

3. The period adjustment circuit as claimed in claim 1, wherein the restart voltage plus the emitter-to-base conduction voltage of said transistor stored by said second capacitor is larger than a voltage of said first capacitor when said disconnection and restart IC is restarted.

4. The period adjustment circuit as claimed in claim 1, wherein said resistor has a value selected to define a charging rate of said first capacitor by said second.

* * * * *